Figure 1:
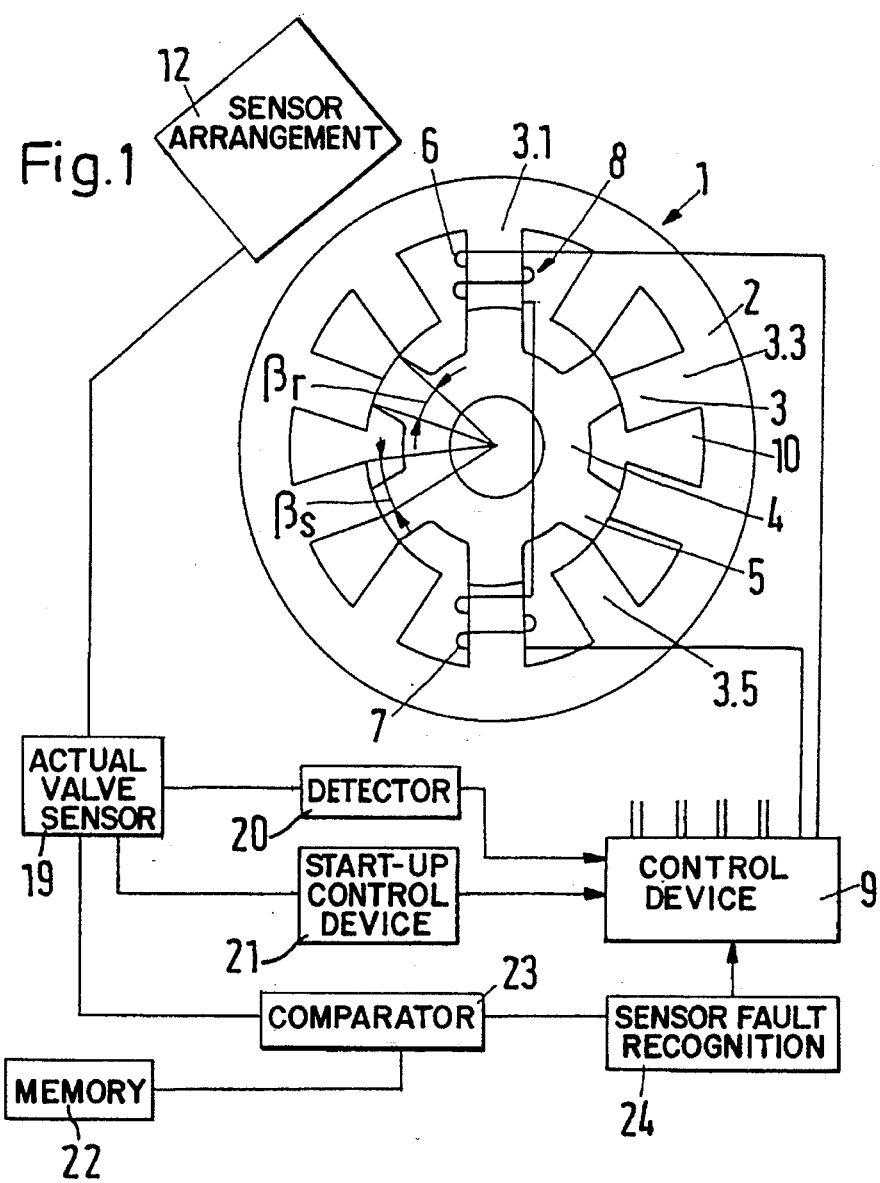

United States Patent

Jensen

Patent Number: 5,517,102
Date of Patent: May 14, 1996

[54] FAULT-TOLERANT RELUCTANCE MOTOR

[75] Inventor: Finn Jensen, Nordborg, Denmark

[73] Assignee: Danfoss A/S, Nordborg, Denmark

[21] Appl. No.: 360,671

[22] PCT Filed: Jul. 2, 1993

[86] PCT No.: PCT/DK93/00220

§ 371 Date: Dec. 19, 1994

§ 102(e) Date: Dec. 19, 1994

[87] PCT Pub. No.: WO94/01919

PCT Pub. Date: Jan. 20, 1994

[30] Foreign Application Priority Data

Jul. 8, 1992 [DE] Germany ............ 42 22 370.9

[51] Int. Cl.[6] .................. H02K 37/02; H02P 6/22
[52] U.S. Cl. ............................ 318/701; 318/254
[58] Field of Search .................... 318/701, 690, 318/695, 696, 138, 254, 439

[56] References Cited

U.S. PATENT DOCUMENTS

| | | | |
|---|---|---|---|
| 4,434,389 | 2/1984 | Langley et al. | 318/254 |
| 4,896,088 | 1/1990 | Jahns | 318/696 |
| 4,896,089 | 1/1990 | Kliman et al. | 318/701 |
| 5,422,525 | 6/1995 | Mansir | 310/179 |

*Primary Examiner*—Bentsu Ro
*Attorney, Agent, or Firm*—Lee, Mann, Smith, McWilliams, Sweeney & Ohlson

[57] ABSTRACT

A fault-tolerant reluctance motor has a multi-phase stator winding. The stator has a different number of poles from the rotor. The lead angle and the pole angle ($\beta_s$, $\beta_r$) embraced by each stator and rotor pole is at least the same as twice the step angle $$\epsilon = \frac{360°}{q \cdot N_r}$$

where q is the number of phases and $N_r$ is the number of rotor poles. In particular, the stator has ten poles, the rotor has six poles and the stator winding has five phases. Such a reluctance motor starts up from any motor position in one or other direction of rotation, even when one of the phase windings is completely or partially ineffective owing to a fault.

12 Claims, 3 Drawing Sheets

Fig.5

| Rotor position | Bit 4 | Bit 3 | Bit 2 | Bit 1 | Bit 0 | Decimal number |
|---|---|---|---|---|---|---|
| 0° | 0 | 0 | 0 | 0 | 1 | 1 |
| 6° | 0 | 0 | 0 | 1 | 1 | 3 |
| 12° | 0 | 0 | 0 | 1 | 0 | 2 |
| 18° | 0 | 0 | 1 | 1 | 0 | 6 |
| 24° | 0 | 1 | 1 | 1 | 0 | 14 |
| 30° | 1 | 1 | 1 | 1 | 0 | 30 |
| 36° | 1 | 1 | 1 | 0 | 0 | 28 |
| 42° | 1 | 1 | 1 | 0 | 1 | 29 |
| 48° | 1 | 1 | 0 | 0 | 1 | 25 |
| 54° | 1 | 0 | 0 | 0 | 1 | 17 |
| 60° | 0 | 0 | 0 | 0 | 1 | 1 |
| 66° | 0 | 0 | 0 | 1 | 1 | 3 |
| 72° | 0 | 0 | 0 | 1 | 0 | 2 |

Fig.6

| Phase | Primary | Secondary |
|---|---|---|
| 1 on | Sensor 1 ↓ | Sensor 4 ↑ |
| 1 off | Sensor 2 ↑ | Sensor 1 ↑ |
| 2 on | Sensor 5 ↓ | Sensor 3 ↑ |
| 2 off | Sensor 4 ↓ | Sensor 5 ↑ |
| 3 on | Sensor 2 ↑ | Sensor 1 ↑ |
| 3 off | Sensor 3 ↓ | Sensor 2 ↓ |
| 4 on | Sensor 4 ↓ | Sensor 5 ↑ |
| 4 off | Sensor 1 ↓ | Sensor 4 ↑ |
| 5 on | Sensor 3 ↓ | Sensor 2 ↓ |
| 5 off | Sensor 5 ↓ | Sensor 3 ↑ |

FAULT-TOLERANT RELUCTANCE MOTOR

The invention relates to a fault-tolerant reluctance motor, in which the stator has a different number of poles from the rotor, the stator winding formed by the coils associated with the stator poles is multi-polar, and a control device is provided which switches the individual phases on cyclically through a respective lead angle, the rotor, during normal operation, starting up from an arbitrary position selectively in one or other direction and, on the occurrence of a fault, continuing to run with reduced torque.

Reluctance motors in which a fault in the system, such as the failure of a phase winding, whether as a result of line break, short-circuiting, failure of the switch element or faults in the control system, does not lead to stopping of the motor, are known as fault-tolerant reluctance motors.

According to US-PS 48 96 089, a four-phase motor with eight stator poles and six rotor poles is designed so that on failure of a phase it still continues to run with reduced torque. Because of the missing phase, however, dead zones are created, in which the motor does not start up again in each desired direction of rotation. On the contrary, the rotor first has to be rotated in the opposite direction before it is able to run in the desired direction.

In a fault-tolerant reluctance motor of the kind described in the introduction (US-PS 48 96 088), this disadvantage is eliminated in that the phase windings do not, as is customary, consist of two series-connected and jointly switched pole coils, but of two individually switchable pole coils. When just the one pole coil is switched off on the occurrence of a fault, the other coil remaining in operation is sufficient to avoid a dead zone preventing start-up. This requires, however, twice the circuit complexity in the control device. In addition, it is frequently necessary to take the whole phase winding out of commission when a fault occurs.

The invention is based on the problem of providing a fault-tolerant reluctance motor with which, even when a fault occurs at a random location in the motor, in the control electronics for the commutation or in the sensor arrangement for measuring the rotor position, continued operation of the motor, and in particular start-up of the rotor from any position selectively in one or other direction, is possible.

This problem is solved according to the invention in that the lead angle as well as the pole angle embraced by each stator and rotor pole is at least the same as twice the step angle $$\epsilon = \frac{360°}{q \cdot N_r}$$

in which q is the number of phases and $N_r$ gives the number of rotor poles.

The step angle taken here as the reference dimension describes the angle through which the rotor turns when switching from one phase configuration to the next. The pole angle measurement claimed according to the invention leads to co-ordination of at least two rotor poles with corresponding stator poles in such a way that when these stator poles are energized the rotor experiences torques in the same direction of rotation. If energizing of the one stator pole therefore fails owing to a fault, the other stator pole ensures that the rotor continues to turn with a slightly reduced torque and is even able to start up from any rotor position in the desired direction of rotation. The claimed lead angle, that is, the rotor angle of rotation during which the relevant phase winding is conductive, is of such magnitude that the desired energizing of both stator poles is possible.

Of course, the stator pole angle should not be so large that there is no longer room for the pole coil. With the theoretically smallest number of poles the motor thus has ten stator poles and four rotor poles with five phases. Since the step angle for this construction is 18° however, the stator pole angle is 36°. There is therefore no room left to wind the coil.

The motor that comes closest to satisfying requirements, in which the stator has ten poles, the rotor six poles and the stator winding five phases, is preferred. This produces a step angle of 12° and a stator pole angle of at least 24°. This is the optimum solution for practical operation.

Further reluctance motors suitable for practical operation have a ratio of stator poles to rotor poles of 10/8, 10/12, 12/10, 12/14 etc. Since this involves larger numbers of poles, however, and more poles therefore have to be wound, the 10/6 ratio is preferred.

It is an advantage if the lead angle and the stator pole angle are each 24° and the rotor pole angle is 30°. The ratio of pole areas and winding space is thus at its most favourable.

It is advisable to include a sensor arrangement, which has q sensors, each of which is able to assume substantially two initial states, and each of which after a rotor rotation through $\epsilon/2$ changes its combination of states such that it repeats itself only after a rotor rotation through $360°/N_r$. This produces a plurality of rotor position ranges which are uniquely described by the combination of states. The changeover to a new combination of states is able to effect switching over of the phase currents. If the subsequent actual combination of states does not correspond to the expected desired combination of states, there is a fault within the sensor arrangement.

It is also advantageous for the sensor to be fixedly mounted and to co-operate with covering elements which rotate with the rotor, each of the covering elements and the gaps left between them embracing an angle of $360°/2\times N_r$. The covering elements, which may also be formed by the rotor poles, ensure that the change-over of the initial states takes place periodically, which facilitates evaluation.

It is an advantage that on each change-over of the combination of states only one sensor changes its initial state. It is consequently possible to recognise the particular sensor or its evaluation branch affected by a fault, and take appropriate remedial action.

In the simplest case, the sensor arrangement has five sensors and their combination of states changes after a rotor rotation of 6°. A construction of that kind is suitable for a motor with ten stator poles, six rotor poles and five phases.

The sensors are especially advantageously arranged in relation to the rotor so that the particular combination of states is composed of both initial states. If, despite this, all sensors have the same initial state, then this indicates a fault, for example, the failure of the voltage supply to the sensors.

This requirement can be satisfied, for example, in the five-sensor arrangement described previously, in that the four subsequent sensors have an angular spacing from the first sensor of 6°, 12°, 24° and 48°. This in fact ensures that always some of the sensors are assigned to one rotor pole and some are assigned to a gap between rotor poles.

A preferred embodiment is characterized by a start-up control device which switches the phases on and/or off in dependence on the actual combination of states. By setting the desired direction of rotation the stator poles are energized so that the rotor starts up. Further commutations can then be effected in dependence on the change in the actual combination of states.

In a further preferred embodiment, there is a memory, from which the successive desired combinations of states can be derived one after the other, a comparator, which compares this desired combination of states with the actual combination of states, and a sensor fault recognition device, which responds when the compared combinations of states are inconsistent. In this manner a fault in the sensor range is automatically detected. Its effects can be kept to a minimum by appropriate remedial measures.

A very important development consists in a control device which switches each individual phase on and/or off when an associated sensor changes its state and, on failure of this sensor control, when the next sensor changing its state changes state. The fault in a sensor or its evaluation circuit does not therefore give rise to the associated phase being switched off completely, but merely to a shifting of the instant of switching on and optionally also of the instant of switching off. The loss of rotary torque is therefore negligible.

Figure 2:
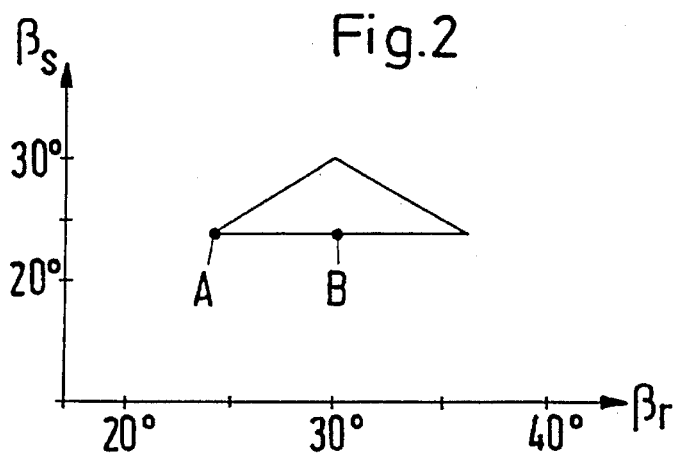
Figure 3:
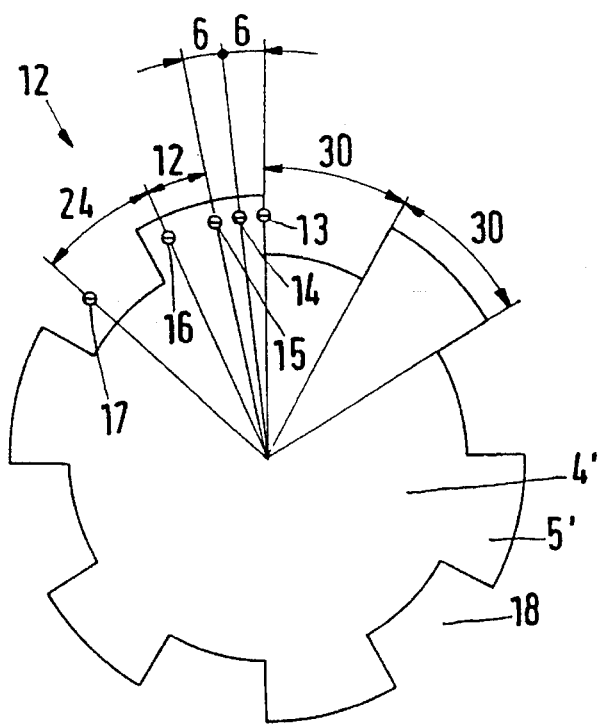
Figure 4:
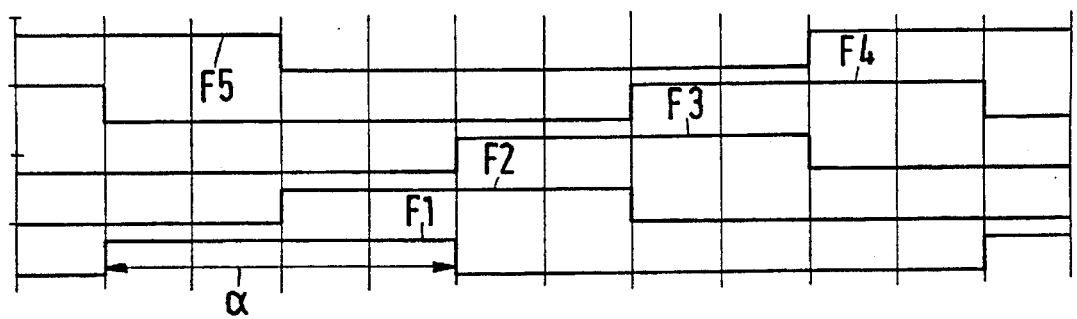
Figure 4:
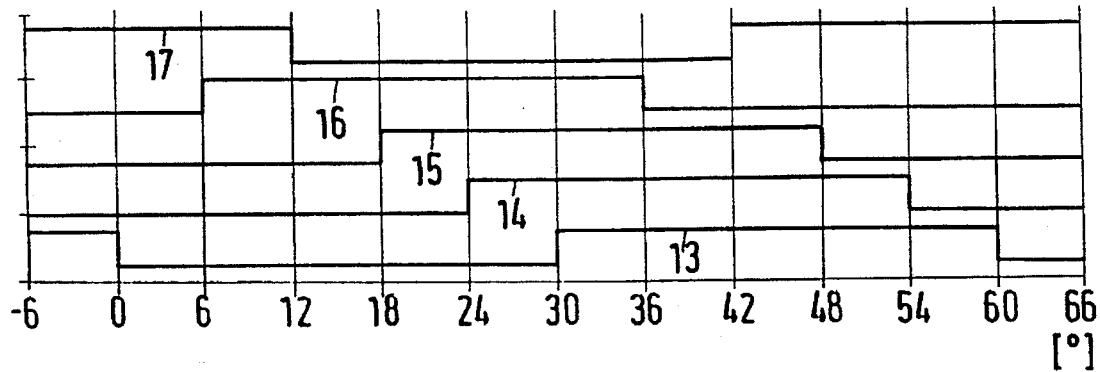

The invention is explained in detail below with reference to a preferred embodiment illustrated in the drawing, in which FIG. 1 shows a reluctance motor according to the invention with its associated circuit, FIG. 2 shows a diagram of the sizes of the stator and rotor pole angles, FIG. 3 shows the rotor in combination with a sensor arrangement, FIG. 4 shows in a single diagram the initial states of the sensors at the bottom and the switching-on states of the individual phases at the top of the diagram, FIG. 5 is a table of the substitute triggering of the individual phases and FIG. 6 is a table of the correlation between sensor initial state and rotor position.

The reluctance motor 1 illustrated in FIG. 1 has a stator 2 with ten poles 3 and a rotor 4 with six poles 5. The stator poles 3 lying opposite one another carry respective coils 6 and 7 which are connected in series with a phase winding 8 and are switched on and off by a control device 9. The other four phase windings, not illustrated, are of similar construction and are connected to the other four outputs of the control device 9. They are switched on cyclically one after the other through a given lead angle α.

The stator poles 3 embrace a stator pole angle $\beta_s$ and the rotor poles 5 embrace a rotor pole angle $\beta_r$. With the number of poles selected here, the angles lie at the edge of or inside the triangle illustrated in FIG. 2. Each pole angle must amount to at least 24°, as indicated by the point A in the diagram. The minimum value is preferred for the stator poles 3 because there is then ample room in the pole gaps 10 for the coils 6 and 7. The stator pole angle $\beta_s$ may, however, be between 24° and 30° and the rotor pole angle $\beta_r$ may be between 24° and 36°. FIG. 1 shows a rotor pole angle of 24° and FIG. 3 shows a rotor pole angle of 30°. The latter angle corresponds to the point B in FIG. 2 and is preferred when the rotor poles 3 are intended to serve at the same time as the "covering" elements for a sensor arrangement 12.

The minimum angle $\beta_s$ and $\beta_r$ is twice as big as the step angle $$\epsilon = \frac{360°}{q \cdot N_r}$$

where q is the number of phases 5 and $N_r$ denotes the number of rotor poles 6. This step angle indicates how far the rotor 4 turns if, instead of the stator poles 3.1, the stator poles 3.3 are energized. According to the invention the stator poles 3.5 also are energized at the same time, so that even if energizing of the pole 3.3 fails, a torque, even a starting torque, is still exerted on the rotor 4.

FIG. 3 illustrates a rotor 4' with rotor poles 5' embracing a pole angle of 30°, combined with the sensor arrangement 12 which comprises five individual sensors 13 to 17 which co-operate alternately with a rotor pole 5' as covering element and a corresponding gap 18. The distances of the sensors 14 to 17 from the first sensor 13 are 6°, 12°, 24° and 48°, as can be inferred from the degree information given in FIG. 3. For example, when the sensors lie opposite the rotor pole, the starting position they assume is "low" or 0, and when they lie opposite the gap 18, the starting position they assume is "high" or 1.

Assuming that the rotor 4' rotates in a clockwise direction and that the sensor 13 has just changed from the initial state 1 to the initial state 0, the initial states for the individual sensors 13 to 17 are those illustrated in the lower part of FIG. 4. Every six degrees a sensor changes its state, namely in the sequence 13, 16, 17, 15 and 14, whereupon the cycle starts again with the sign reversed.

For each rotor position there is an exactly defined combination of states. This corresponds, for example, between 0° and 6° in the sequence of the sensors 13 to 17 to 0-0-0-0-1. Regarding each of these initial states as a bit, then the correlation illustrated in FIG. 5 between the rotor position and the combination of states is obtained. Each combination consists of the initial states 1 and 0. All combinations produce different values, as further emphasized by the decimal number given in the last column.

The sensor arrangement 12 relays the initial states of the individual sensors to an actual value circuit 19 which is available for the particular combination of states. Starting from the actual combination of states ascertained, a detector 20 identifies the change-over to the next combination of states and consequently initiates corresponding switching processes in the control device 9. As FIG. 4 shows, the individual phases F1 to F6 are each switched on through a lead angle α of 24°. Phase F1 is switched on as the sensor changes from 1 to 0 and is switched off as the sensor 14 changes from 0 to 1. This can also be inferred from the second column of FIG. 6.

When the rotor is meant to start-up, the start-up control device 21 becomes effective. It receives the existing combination of states from the actual value sensor 19 and defines the pattern of the phase activation by the control device 9 according to the current rotor position. The rotor therefore starts up in the desired direction. The control can then be taken over by the detector 20 at the latest on the second change-over of the combination of states.

All combinations of states are stored in a memory 22. They are therefore read out in the sequence corresponding to the successive rotor positions. A comparator 23 compares the particular desired combination of states with the actual combination of states, as given by the actual value sensor 19. If the compared combinations of states are inconsistent, there is a fault in the sensor arrangement, that is, in a sensor or the associated evaluating circuit. In that case, a sensor fault recognition device 24, which causes the control device 9 to switch over, is activated. Since it is only the initial state of a sensor 13 to 17 that changes on each change in the combination of states, it is possible to recognise which sensor is faulty and is therefore no longer able to switch a phase on or off. Switch-over then causes in each case the sensor that is next to change over its initial state to switch the relevant phase on or off; this is apparent from the third column "Secondary" of the FIG. 6. This means a delay in switching on of the phase in question and optionally a reduction in the lead angle α. At any rate, a considerable part of the phase in question remains effective despite the failure of its associated sensor.

Determination of a faulty sensor is relatively simple. With a given rotor position and consequently a given combination of states, when operation is without faults two combinations of states can follow, namely that for a positive angle of rotation of 6° and that for a negative angle of rotation of 6°. If any combination of states other than these two combinations of states follows, there is a fault present. The faulty sensor can be identified in that its initial state has not changed, although a change-over would have been necessary.

It may happen that a fault occurs such that after the first change-over in one direction of rotation, a combination of states is obtained which, after the first change-over, would be correct for a rotation in the opposite direction. At the latest on the second change of state, however, it is clearly apparent whether and what fault is present in the sensor arrangement. In the present embodiment, the second state change occurs after a rotor rotation of 12°. This corresponds to the normal step angle through which the rotor is rotated even with a phase missing. A sensor fault can therefore be detected even during start-up with the aid of the start-up control device 21, and the corresponding remedial program implemented with the aid of the sensor fault recognition device 24.

As sensors any of the known sensors can be used, for example Hallgenerators. They need not co-operate directly with the rotor. They may also be influenced by a disc, appropriately subdivided, rotating with the rotor.

I claim:

1. A fault-tolerant reluctance motor having a rotor and a stator, the stator having a different number of poles from the rotor and each stator winding formed by coils associated with the poles of the stator being multi-polar, and including a control device which switches individual phases on cyclically through a respective lead angle, the rotor, during normal operation, starting up from an arbitrary position selectively in one or other direction and, on the occurrence of a fault, continuing to run with reduced torque, in which the lead angle ($\alpha$) and pole angle ($\beta_1$, $\beta_s$) embraced by each stator and rotor pole is at least the same as twice the step angle $$\epsilon = \frac{360°}{q \cdot N_r}$$

where q is the number of phases and $N_r$ is the number of rotor poles.

2. A motor according to claim 1, in which the stator has ten poles, the rotor has six poles, the stator winding has five phases and the lead angle ($\alpha$) is at least 24°.

3. A motor according to claim 2, in which the lead angle ($\alpha$) and the stator pole angle ($\beta_s$) are each 24° and the rotor pole angle ($\beta_r$) is 30°.

4. A motor according to claim 1, a sensor arrangement, which has q sensors, each of which is able to assume substantially two initial states, and each of which, after a rotor rotation through $\epsilon/2$, changes its combination of states such that it repeats itself only after a rotor rotation through $360°/N_r$.

5. A motor according to claim 4, in which that the sensors are fixedly mounted and cooperate with covering elements which rotate with the rotor, each of the covering elements and gaps left between the coveting elements embracing an angle of $360°/2 \times N_r$.

6. A motor according to claim 4, in which, on each change-over of the combination of states, only one sensor changes its initial state.

7. A motor according to claim 4, in which the sensor arrangement has five sensors and their combination of states changes after every rotor rotation of 6°.

8. A motor according to claim 7, in which four subsequent sensors have an angular spacing from the first sensor of 6°, 12°, 24° and 48°.

9. A motor according to claim 4, in which the sensors are arranged in relation to the rotor so that a particular combination of states is composed of both initial states.

10. A motor according to claim 4, including a start-up control device which switches the phases on and off in dependence on an actual combination of states.

11. A motor according to claim 4, including a memory from which successive desired combinations of states can be derived one after the other, a comparator which compares this desired combination of states with a current actual combination of states, and a sensor fault recognition device which responds when compared combinations of states are inconsistent.

12. A motor according to claim 4, including a control device which switches each individual phase on and off when an associated sensor changes state and, on failure of this associated sensor, when a next sensor changes state.

* * * * *